United States Patent [19]

Brouckson

[11] 3,768,833
[45] Oct. 30, 1973

[54] FLOW CONTROL VALVE

[75] Inventor: Robert Henry Brouckson, Grosse Pointe Woods, Mich.

[73] Assignee: Eaton Corporation, Cleveland, Ohio

[22] Filed: Nov. 26, 1971

[21] Appl. No.: 202,093

[52] U.S. Cl. ............ 280/150 AB, 137/70, 137/538, 137/580, 137/625.3, 138/45
[51] Int. Cl. ............................................. B60r 21/08
[58] Field of Search ................ 280/150 AB; 137/67, 137/68, 69, 70, 71, 538, 580, 625.3; 23/281; 138/45

[56] References Cited
UNITED STATES PATENTS

| | | | |
|---|---|---|---|
| 3,638,964 | 2/1972 | Chute | 280/150 AB |
| 3,547,467 | 12/1970 | Pociask | 280/150 AB |
| 3,305,319 | 2/1967 | Kowalick et al. | 23/281 |
| 3,653,684 | 4/1972 | Plumer | 280/150 AB |
| 3,197,234 | 7/1965 | Bertrand | 137/70 X |
| 3,602,527 | 8/1971 | Goetz et al. | 280/150 AB |

*Primary Examiner*—Kenneth H. Betts
*Assistant Examiner*—John P. Silverstrim
*Attorney*—Thomas E. Davis

[57] ABSTRACT

An improved safety apparatus for protecting an occupant of a vehicle during the occurrence of a collision includes an expandable confinement having a collapsed condition and an expanded condition for restraining movement of an occupant of a vehicle during a collision and means for expanding the confinement to the operative condition during a collision. The means for expanding the confinement includes a fluid supply which is actuatable to supply fluid for expanding the confinement, means for actuating the fluid supply in response to a collision, a diffuser means in fluid communication with the confinement for receiving fluid from the fluid supply and for distributing the fluid to the confinement for expanding the confinement, and means cooperating with the diffuser for controlling an initial portion of fluid distribution from the diffuser to the confinement. In a preferred embodiment, the means cooperating with the diffuser means includes a member slidable along a surface of the diffuser under the influence of fluid pressure from the fluid supply to sequentially uncover a series of openings in the diffuser thereby controlling the flow of fluid from the diffuser to the confinement.

7 Claims, 2 Drawing Figures

3,768,833

FLOW CONTROL VALVE

BACKGROUND OF THE INVENTION

1. Field of the invention

The present invention relates to a vehicle safety apparatus including an expandable confinement having a collapsed inoperative condition and an expanded operative condition for protecting an occupant of a vehicle during a collision.

2. Description of the prior art

A known safety apparatus for protecting an occupant of a vehicle includes an expandable confinement having a collapsed inoperative condition and an expanded operative condition. The known safety apparatus, in addition to the confinement, includes a fluid supply, means for actuating the fluid supply in response to a collision, and diffuser means for distributing and directing the flow of fluid from the fluid supply to the confinement for inflating the confinement. One such prior art device is U.S. Pat. No. 3,602,527, issued Aug. 31, 1971 and assigned to the assignee of the instant invention. The specification of U.S. Pat. No. 3,602,527 is hereby incorporated by reference into the specification of the instant application.

One major problem which exists with respect to inflatable occupant restraint systems is the protection of the standing child or a person located too close to the system when it is actuated. If such is the case, the rapidly expanding confinement would apply a very large force directly to the occupant.

Some effort has been made to solve this problem by controlling initial confinement inflation in such a manner that the confinement moves the occupant away with a relatively light force and positions the occupant before the full force of confinement inflation occurs. However, since the total time available for inflating the confinement is dictated by other considerations, the total average flow rate of inflating fluid must remain relatively fixed.

Two such efforsts are disclosed in co-pending application Ser. No. 849,394 filed Aug. 12, 1969, in the name of Richard Chute and U.S. letters Pat. No. 3,477,740 issued in the name of Hass and assigned to the assignee of the instant invention. The device disclosed in the Hass patent includes a diffuser having passages to direct fluid for the purpose intended but does not include a flow control means which cooperates with the diffuser means to control initial expansion of the confinement.

SUMMARY OF THE PRESENT INVENTION

The present invention is directed to controlling the initial inflation of the confinement in order to protect the unrestrained child or out-of-position occupant.

The present invention is a practical, unique construction for accomplishing the purpose intended.

Accordingly, it is an object of the present invention to provide a new and improved safety apparatus for a vehicle including an expandable confinement, a fluid supply actuatable in response to the vehicle encountering a collision, and a diffuser means for diffusing and directing fluid from the fluid supply for expanding the confinement and including an improved means cooperating with the diffuser means for controlling the initial expansion of the confinement.

Another object of the present invention is to provide a new and improved safety apparatus for protecting an occupant of a vehicle during a collision including an expandable confinement having a collapsed condition and an expanded condition for restraining an occupant of a vehicle during the collision, a fluid reservoir containing a fluid supply therein, means for actuating the fluid supply to supply fluid for expanding the confinement in response to a collision, a diffuser means for diffusing and directing fluid to expand the confinement, and a member slidable along a surface of the diffuser means to control fluid flow to the confinement and thereby control expansion thereof.

Other objects and advantages of the present invention will become more apparent from the following description and accompanying drawings in which;

DESCRIPTION OF THE PREFERRED EMBODIMENT

The present invention relates to a vehicle safety apparatus for protecting an occupant of a vehicle during a collision. The safety apparatus includes an expandable confinement having a collapsed condition and an expanded condition in which the confinement is effective to restrain movement of an occupant during a collision. A pressurized fluid reservoir in the illustrated embodiment of the invention supplies fluid to the interior of the confinement upon the occurrence of a collision to effect expansion of the confinement. An electrically operated explosive valve is disposed in the fluid reservoir nromally blocking flow therefrom and is operable to allow fluid to flow from the reservoir upon the occurrence of a collision. The explosive valve is electrically connected to a battery by means of a collision sensor or switch (not shown) which is well known in the art and actuatable in response to the occurence of a collision to close a pair of electrical contacts actuating the explosive and opening the valve. Since, the collision sensor forms no part of the instant invention, a further description of that device will not be undertaken at this time, however, devices suitable for performing that function are disclosed in U.S. letters Pat. Nos. 3,556,556; 3,552,768 and 3,495,675. After actuation of the fluid supply, fluid flows along a manifold to a diffuser member having a plurality of spaced openings therein communicating with the confinement for inflating the confinement to restrain the occupant during the collision. Interposed between the manifold and the diffuser member, is a member which is movable along a surface of the diffuser member under the influence of fluid pressure from the fluid supply, to sequentially uncover the openings in the diffuser member to allow fluid to flow from the diffuser member into the confinement and thereby control inflation of the confinement.

Figure 1:
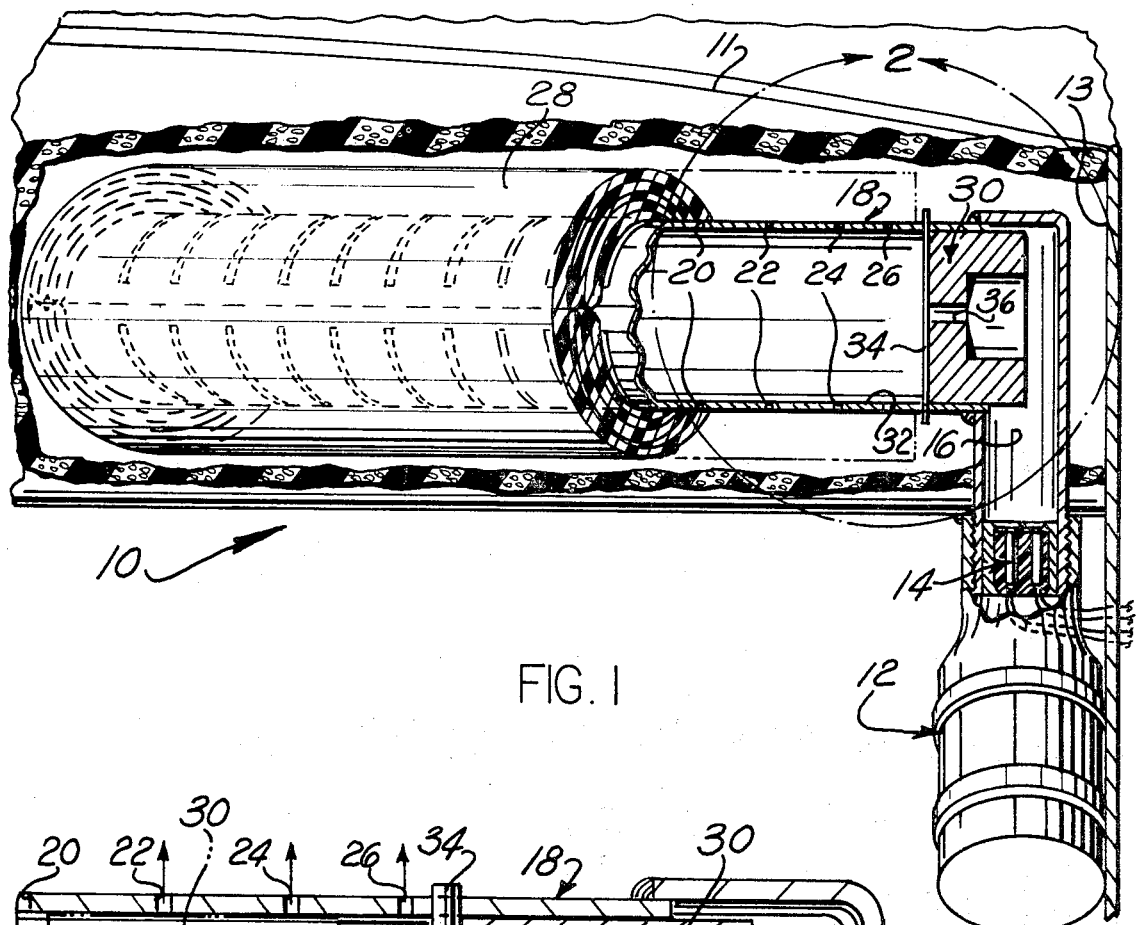
FIG. 1 is a schematic view illustrating a preferred embodiment of the instant invention.

Accordingly, as illustrated in FIG. 1, a safety apparatus 10 is mounted in a dashboard 11 of a vehicle and includes a pressurized fluid supply 12 mounted on a sidewall 13 of the vehicle. The pressurized fluid supply 12 has an explosive valve 14 normally preventing flow therefrom. Since the explosive valve 14, forms no part of the instant invention, a further description of that device will not be undertaken at this time, however a device suitable for performing that function is disclosed in copending application Ser. No. 730,024 filed May 17, 1968, in the name of George Ekstrom and assigned to the assignee of the instant invention. The explosive valve 14, is actuatable in response to the vehicle encountering a collision condition by a collision sensor (not shown) of a suitable type.

The pressurized reservoir 12 is connected by means of a manifold 16 to a diffuser member 18 having a plurality of slots 20, 22, 24, 26 in an exterior surface thereof to provide a fluid flow path between the reservoir 12 and the confinement 28. The diffuser member 18, is of generally tubular configuration and extends in a longitudinal direction in the interior of an expandable confinement 28 (shown in FIG. 1 in the normally collapsed or inoperative condition) mounted on the dashboard 11 and extending across the front of a passenger compartment of the vehicle. The slots 20, 22, 24, 26 are spaced along the longitudinal axis of the diffuser member along the interior of the expandable confinement 28 and provide fluid communication between the interior of the diffuser member and the interior of the confinement to provide a fluid flow path therebetween for inflating the confinement.

Interposed between the manifold 16 and the diffuser member 18 and in the fluid flow path from the pressurized container 12 is a flow regulating member 30. The flow regulating member 30 engages an interior peripheral surface 32 of the tubular diffuser member 18. The member 30 is sized with respect to the interior peripheral surface of tubular diffuser member 18, so as to be slidable therealong under the influence of fluid pressure in the fluid flow path between the pressurized reservoir 12 and member 30.

A shear pin 34 is illustrated in FIG. 1 as passing through the walls of tubular diffuser member 18 and engaging an end surface of member 30 to thereby normally restrain movement of member 30 until a predetermined pressure is reached in the flow path defined by manifold 16. This shear pin 34 could be replaced by a spring or any other mechanical equivalent, the important consideration being to insure that the member 30 is maintained in the initial position as shown in FIG. 1 until after actuation of the explosive valve 14 and pressurization of the manifold 16 by fluid flowing from the pressurized container 12.

Figure 2:
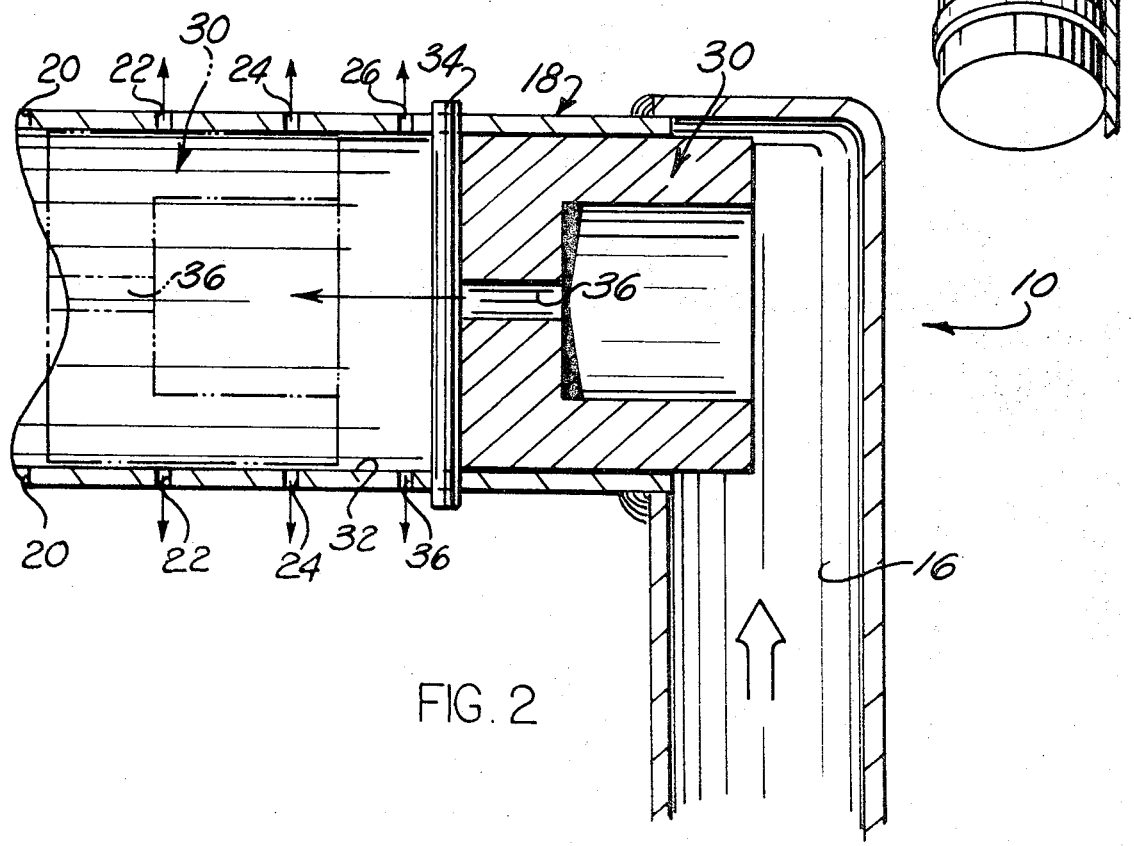
FIG. 2 is an enlarged view of the portion of FIG. 1 indicated by the circle 2, illustrating the preferred embodiment of the instant application in greater detail.

As can better be seen by reference to FIG. 2, the member 30 has an orifice 36 passing therethrough to provide an initial release of pressure and small amount of flow which will be effective to "puff" the confinement 28 almost immediately upon actuation of explosive valve 14 as a result of flow from the pressurized container 12. "Puffing" of the confinement provides for a relatively "soft" initial movement of the confinement whereby the confinement will gently but firmly engage a child who may be standing adjacent the dashboard 11 of the vehicle and begin moving him away from the dashboard and toward a vehicle seat (not shown). "Puffing" of the confinement 28 further is desirable to begin expansion thereof to prevent the material of confinement 28 from being directly exposed to the high pressure streams of fluid flow from openings 20, 22, 24 etc. which will follow after member 30 has passed thereacross.

It is important to note that the orifice 36, must be sized so as to have a smaller effective flow area than the total accumulative effective flow area of openings 20, 22, 24, 26 etc. in the diffuser member 18 to prevent a pressure buildup in the diffuser member which would restrain member 30 from slidably moving along diffuser member 18 under the influence of pressure in the manifold 16. Further, the effective flow area of orifice 36 must be much smaller than the effective flow area through explosive valve 14 when in the open condition to allow the required pressure buildup.

DESCRIPTION OF OPERATION

In operation, when the vehicle encounters a collision, a collision sensor of a known type (not shown) provides an electrical signal for actuating the explosive valve 14, actuation of the explosive valve 14 opens a flow path for the pressurized fluid contained in pressurized container 12 to pass along manifold 16, in the direction as designated by the arrow in FIG. 2, to a position behind member 30. Since, as previously noted, the orifice 36 in member 30 is rather small compared to the opening in the explosive valve, a pressure build up begins to occur within the manifold 16 and exerts a force on member 30 tending to shear the pin 34 which is restraining movement thereof. At this same time, a portion of the fluid flowing from the pressurized container 12 passes through orifice 36 and into diffuser member 18 through slots 20, 22, 24, 26 and etc., to "puff" the confinement 28 thus beginning initial expansion thereof. At this point, if a child were standing adjacent the inoperative position, or dashboard, the "puffed" confinement would engage him and begin moving him away from the dashboard. As pressure builds up in the manifold 16 due to continued flow from the pressurized reservoir 12, the pressure behind member 30 increases rapidly until a predetermined value is reached at which shear pin 34 can no longer restrain movement of the member 30. Shear pin 34 at this point, fails under the force exerted by member 30 thereon and member 30 begins moving rapidly down the diffuser 18.

As member 30 moves down the diffuser 18 under the influence of the relatively high fluid pressure behind it, member 30 sequentially exposes the openings 20, 22, 24, 26 etc. to the high pressure fluid contained in manifold 16 behind member 30. As each of the openings 20, 22, 24, 26 is sequentially exposed to this relatively high pressure fluid, the flow across each of these openings is substantially increased thereby increasing the flow to the confinement 28 for expansion thereof. Thus movement of member 30 provides an increasing rate of expansion for confinement 28 until member 30 reaches the furthest end of tubular diffuser 18. If an occupant is out of normal seating position, the confinement may thus engage the occupant during inflation and position that occupant to be properly restrained by the fully inflated confinement. The confinement 28 thus does not receive the maximum flow from diffusuer member 18 until the last opening (that furthest from the member 30 as shown in FIG. 1) in the diffuser member 18 has been opened to the high pressure fluid behind member 30 by member 30 passing thereacross. At this time, the confinement will receive the full amount of maximum flow that the pressure on the fluid in container 12 is capable of supplying and the flow will continue until the confinement 28 is fully inflated and in position to restrain movement of an occupant relative to the vehicle.

Thus, either a child who may have been standing adjacent the dashboard 11 or an out of position occupant may be initially engaged more gently than with prior art inflatable safety devices. Further, the child or occupant may be moved or positioned relative to a vehicle seating position by inflation of the confinement for proper engagement with the fully enflated confinement. All of this is accomplished with the least possible sacrifice in confinement inflation speed.

From the foregoing, it should now be evident that the present invention provides a new and novel means of controlling fluid flow in a safety device having an expandable confinement for restraining movement of an occupant of a vehicle during a collision.

Having described the preferred embodiment of my invention I claim:

1. In a safety apparatus for protecting an occupant of a vehicle and which safety apparatus comprises a confinement having a collapsed inoperative condition and an expanded operative condition for restraining movement of the occupant during a collision, and means for expanding said confinement to the operative condition during a collision, said means for expanding said confinement including a fluid supply actuatable to supply fluid for expanding said confinement, means for actuating said fluid supply in response to a collision, and diffuser means in fluid communication with said confinement and connected to receive fluid from said fluid supply upon actuation thereof and for distributing and directing said fluid to said confinement for expanding said confinement, the improvement comprising means movable along a surface of said diffuser means, said movable means including a member disposed in the flow path between said fluid supply and said diffuser member, wherein said diffuser means includes an elongated tubular member with a plurality of openings disposed along the longitudinal axis thereof, said openings providing fluid communication between the interior of said diffuser and the interior of said confinement, said member being disposed in the flow path and having an orifice therein to allow a portion of the initial flow of fluid from said fluid supply to pass therethrough before movement of said member and said movable member engages the interior surface of said diffuser and is slidable along said surface under the influence of fluid pressure from said fluid supply to sequentially uncover said openings, for controlling the fluid flow from said diffuser to said confinement.

2. The apparatus of claim 1 wherein the improvement further comprises means engaging said member and said diffuser for restraining relative movement therebetween until a predetermined pressure exists in the flow path between said member and said fluid supply.

3. The apparatus of claim 2 wherein said means comprises a shear pin.

4. The apparatus of claim 1 wherein the effective flow area of said orifice is smaller than the cumulative effective flow areas of the slots in said diffuser to thereby prevent a pressure build up in said diffuser which would restrain movement of said member.

5. In a safety apparatus for protecting an occupant of a vehicle and which safety apparatus comprises a confinement having a collapsed inoperative condition and an expanded operative condition for restraining movement of an occupant during a collision, a fluid supply, and means for directing and controlling fluid flow from the supply to the confinement and which means provides for an initial lower volume rate of fluid flow to the confinement and a subsequent larger volume rate of fluid flow into the confinement so that an occupant who may be leaning toward the collapsed confinement is moved by a small force applied to the occupant by the confinement during initial inflation thereof, the improvement wherein said means for directing flow comprises diffuser means having flow passage means in fluid communication with the confinement and connected to receive fluid from said fluid supply, and a control member disposed in the fluid path between said fluid supply and said diffuser cooperating with the diffuser and having an orifice therein for providing said initial fluid flow when in an initial position and movable relative to the diffuser from its initial position to effect said larger fluid flow from the diffuser.

6. The apparatus of claim 5 wherein said control member is disposed in a fluid flow path between said fluid supply and said diffuser, and is movable relative to said diffuser in response to the existence of a predetermined pressure in said flow path to control the flow of fluid from said diffuser to said confinement.

7. The invention of claim 6 wherein said diffuser comprises an elongated configuration having a plurality of openings communicating with said confinement disposed along a longitudinal axis thereof and wherein said control member is movable along the longitudinal axis of said diffuser in response to said predetermined pressure to sequentially uncover said openings thereby controlling the flow of fluid through said openings to said confinement.

* * * * *